United States Patent [19]

Grassl

[11] 4,360,256

[45] Nov. 23, 1982

[54] SINGLE REFLEX CAMERA WITH AN OPTOELECTRONIC DISTANCE METER MOUNTED IN THE VICINITY OF THE VIEW FINDER EYEPIECE

[75] Inventor: Hans-Peter Grassl, Zorneding, Fed. Rep. of Germany

[73] Assignee: Siemens Aktiengesellschaft, Berlin & Munich, Fed. Rep. of Germany

[21] Appl. No.: 253,403

[22] Filed: Apr. 13, 1981

[30] Foreign Application Priority Data

May 14, 1980 [DE] Fed. Rep. of Germany ....... 3018564

[51] Int. Cl.$^3$ ..................... G03B 3/10; G03B 13/06; G03B 13/16
[52] U.S. Cl. .................................... 354/25; 354/155; 354/166; 356/8
[58] Field of Search ................. 354/25 R, 25 A, 25 P, 354/25 N, 31, 31F, 56, 155, 166, 152, 198–201, 219, 224, 225; 352/140; 356/8

[56] References Cited

U.S. PATENT DOCUMENTS 4,147,417  4/1979  Mandler ............................... 354/25
4,290,693  9/1981  Stein ..................................... 354/25

Primary Examiner—William B. Perkey

Attorney, Agent, or Firm—Hill, Van Santen, Steadman, Chiara & Simpson

[57] ABSTRACT

A photographic or electronic camera optoelectronic distance measuring system has a lens with two partial aperture diaphragms which create first and second partial bundles of rays. Two linear image sensors are provided together with optical devices for projecting segments of lines corresponding to two images obtained from the object onto the image sensors. An evaluating circuit, in dependence upon varying position displacements of sensor signals obtained from the one image sensor with respect to the sensor signals obtained from the other image sensor, determines a maximum correlation between these and an associated position displacement. A device is provided for deflecting the ray path at least partially into a view finder. Two focusing lens parts are arranged in a region of an eyepiece of the view finder which locate partial aperture diaphragms of the lens by imaging in the plane of the view finder eyepiece. In a path of rays of partial bundles of rays created by the partial aperture diaphragms, and which project images onto the image sensors, deflection elements are provided which separate both paths of rays from one another.

18 Claims, 3 Drawing Figures

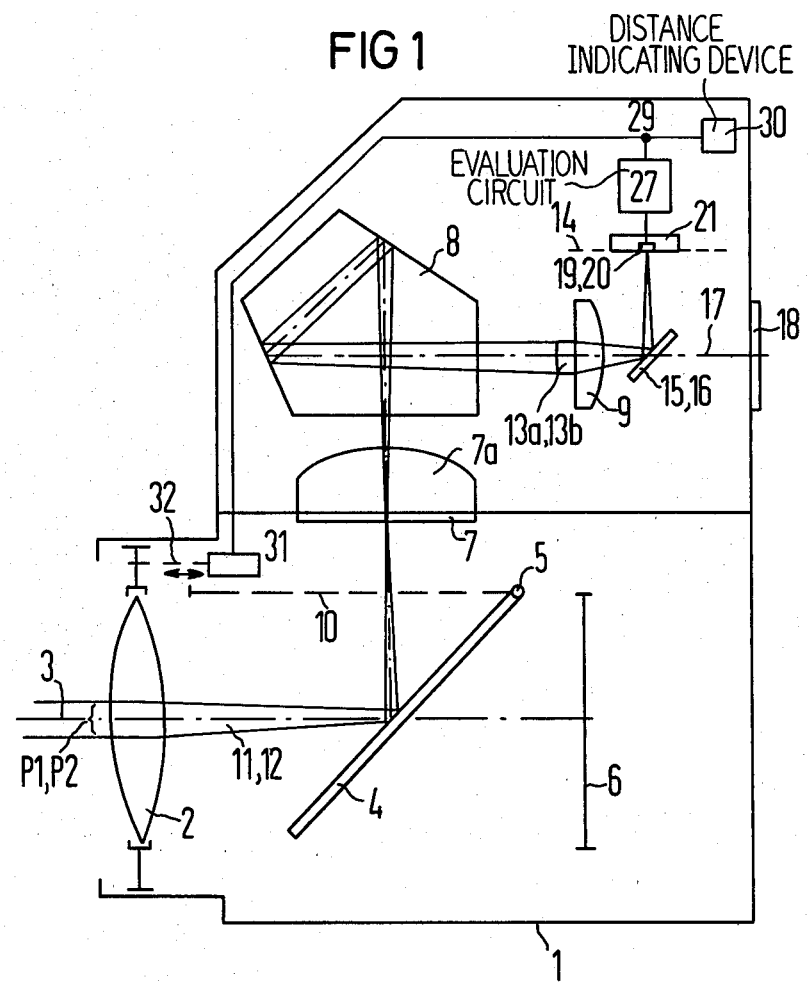

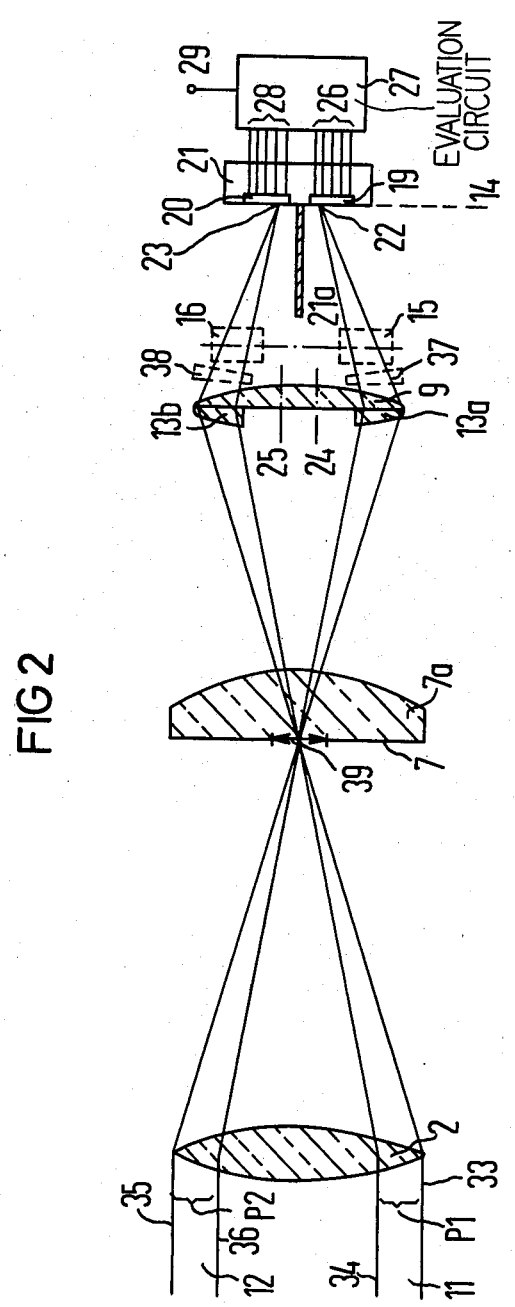

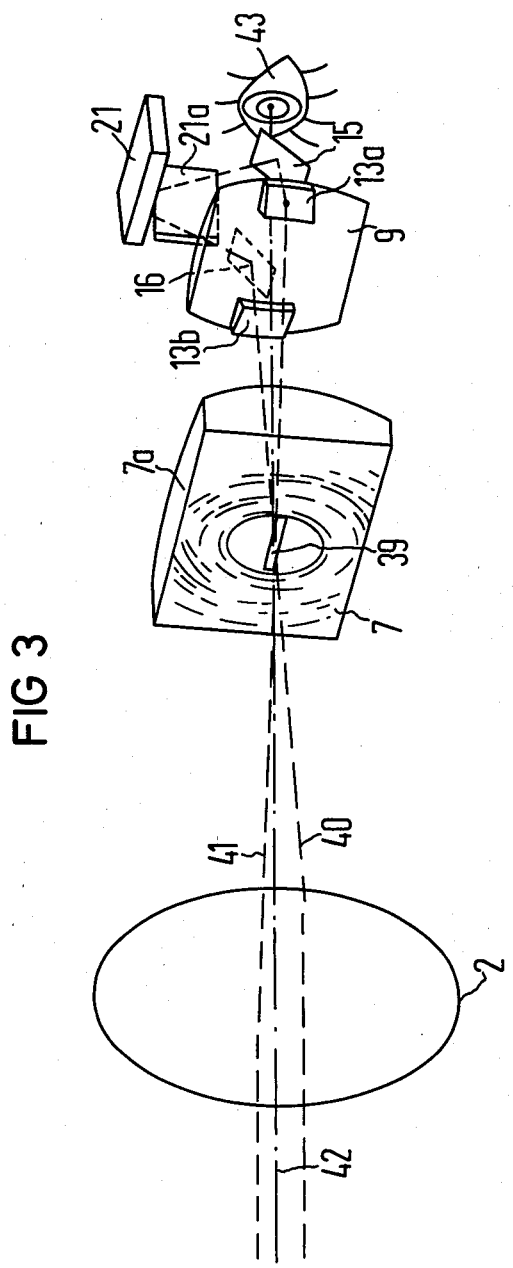

SINGLE REFLEX CAMERA WITH AN OPTOELECTRONIC DISTANCE METER MOUNTED IN THE VICINITY OF THE VIEW FINDER EYEPIECE

BACKGROUND OF THE INVENTION

The invention concerns a photographic or electronic camera with an optoelectronic distance meter and wherein two linear image sensors each having a plurality of sensor elements are provided. Optical devices project segments of lines corresponding to two images obtained from an image onto the image sensors and an evaluating circuit is provided whereby, in dependence upon varying position displacements of sensor signals obtained from the one image sensor with respect to the sensor signals obtained from the other image sensor, a maximum correlation is determined between these signals and an associated position displacement.

A photographic camera of the above-described type, whereby the two images which are required of an object whose distance is to be determined are derived via two partial aperture diaphragms of the camera lens, is known from U.S. Ser. No. 020,812, filed Mar. 15, 1979, now U.S. Pat. No. 4,304,474, incorporated herein by reference. Arrangements for the optoelectronic distance measurement with two linear image sensors are also specified in U.S. Ser. No. 020,813, filed Mar. 15, 1979, now U.S. Pat. No. 4,290,693, and the older U.S. patent applications U.S. Ser. No. 069,788 filed Aug. 27, 1979, now U.S. Pat. Nos. 4,320,302; 168,648 filed July 11, 1980 now U.S. Pat. Nos. 4,334,150; and 172,084 filed July 24, 1980, all incorporated herein by reference. Here, the two images of the object are derived via optical devices which can consist, for example, of two partial aperture diaphragms of a lens, or can consist of two separate lenses which fulfill the same functions.

As proceeds from the named literature selections and older applications, the sensor elements consist of photodiodes, MIS capacitors, or of photodiodes to which in each case MIS capacitors are associated. Within individual time intervals which are also designated as integration times, in each case optically generated charge carriers collect in the sensor elements from which the sensor signals are then derived. In the case of the arrangements according to U.S. Ser. Nos. 020,813 and 020,812, incorporated herein by reference, there proceeds an analog processing of the sensor signals, while the arrangements according to the older patent applications also named differ from this to the extent that the sensor signals must first be digitalized before their further processing.

SUMMARY OF THE INVENTION

It is an object of the invention to solve the problem of individually associating two line sections to be projected onto the linear image sensors. These line sections are derived from an object whose distance is to be determined to the two image sensors in a manner which is as space-saving as possible, without impairing the functions of the camera to an extent worthy of mention. This problem is solved by means of providing a device for deflecting the ray path at least partially into a view finder. Between this device and the view finder a condensing lens is arranged. The two optical devices comprise two focusing lens parts arranged in a region of an eyepiece of the view finder. These lens parts locate the partial aperture diaphragms of the lens aperture diaphragm imaged in the plane of the view finder eyepiece. In a path of rays of the partial bundles of rays which penetrate the lens parts deflection elements are provided which project the images onto the image sensors.

The advantage attainable with the invention consists, in particular, in that the optical elements additionally provided for the distance measurement in no way impair or change the remaining camera functions. Only in the vicinity of the view finder eyepiece are modifications of the conventional camera structure necessary, whereby, however, no impairment of the view finder image results.

BRIEF DESCRIPTION OF THE DRAWINGS

FIG. 1 illustrates a diagram of a single reflex camera designed according to the invention;

FIG. 2 is a view from above onto the path of the rays of the camera according to FIG. 1; and FIG. 3 is a perspective depiction of several optical components of the camera according to FIG. 1.

DESCRIPTION OF THE PREFERRED EMBODIMENTS

In FIG. 1, a single reflex camera with a housing 1 and a lens 2 is depicted schematically. A bundle of rays derived from an object entering through the lens 2 is indicated by means of the midpoint ray 3 coinciding with the optical axis which is depicted with a dot and dash line. A folding or swinging mirror 4, which is rotatably mounted around an axis 5, can be brought into the position which is drawn. There it is located in the path of the rays between the lens 2 and a focal plane 6. Here, for example, a photographic film is provided or, in the case of an electronic camera, a two-dimensional image sensor is provided. Accordingly, it deflects the entering bundle of rays 3 in a direction toward a view finder adjustment or focusing disk 7. This is located in a plane equivalent to the focal plane 6, so that the theme or picture image is more sharply focused on it. The scene or picture image is transferred to a view finder (8,9) by reflecting it via a pentaprism 8 onto a view finder eyepiece 9, in which it then appears upright and non-reversed. Behind the adjustment or focusing disk 7 there is located a field or condensing lens 7a which images the aperture diaphragm of the lens 2 onto a plane in the vicinity of the view finder eyepiece 9. After the scene or picture search and the adjustment of the spacing of the lens 2 from the focal plane 6 to such a value that the object selected is sharply imaged on the focal plane, then the folding or swinging mirror 4 is brought into the position 10 indicated with a broken line, so that the bundle of rays 3 proceeds to the focal plane 6 and the photographic film is exposed or, respectively, is optoelectronically scanned by means of an image sensor.

For the distance measurement, two partial bundles of rays 11, 12 are required which come in through two partial aperture diaphragms P1, P2 of the lens 2. In the depiction according to FIG. 1, they coincide since they lie in front of or, respectively, behind the drawing plane which proceeds through the optical axis. They are defined as those partial bundles of rays which penetrate two parts 13a, 13b of focusing lenses which are mounted on the view finder eyepiece 9. These lens parts 13a, 13b have the effect that each of the partial bundles of rays 11, 12 are sharply imaged on a different point of a plane 14. By means of deflecting surface mirrors 15, 16, the bundles 11, 12 are deflected in each case by 90° so that they are separated from the path of the rays of the scene image indicated by the line 17. This scene image leads to the eyepiece opening 18 of the view finder eyepiece 9. Two linear image sensors 19, 20 are arranged upon a carrier body 21 in such a manner that their sensor elements are located in a common sensor line which in FIG. 1 runs perpendicular to the drawing plane. They further lie in the plane 14 onto which the object is twice sharply imaged in the case of correct adjustment of the lens 2, specifically once via the lens parts 13a and once via the lens part 13b. The carrier body 21 consists in a practical manner of a doped semiconductor body in which the individual sensor elements are integrated.

In FIG. 2, the flattened path of the rays of the partial bundle of rays 11 and 12 is depicted in top view, whereby the deflections brought about by means of the folding mirror 4, the pentaprism 8 and the deflection mirrors 15, 16 are not considered. It can be seen from FIG. 2 that the partial bundle of rays 12 penetrating the lens part 13a is focused on a point 22 of the plane 14. If the lens part 13a were not present, then the bundle 12 would be refracted in such a manner by the view finder eyepiece 9 that it would again travel on in axis parallel fashion. In an analogous manner, the lens part 13b brings about a focusing of the partial ray bundle 11 onto point 23 in the plane 14. The mutual spacing of points 22 and 23 is attained in that the lens part 13a represents a part of a convergent lens, the axis of which is indicated by means of the line 24, while the lens part 13b consists of a part of a convergent lens, the axis of which is indicated with 25.

The image sensors 19 and 20 lying next to one another are arranged in the carrier body 21, the one interface of which lies in the plane 14 in such a manner that the points 22 and 23 in each case lie in the vicinity or range of one of its sensor elements. Each of the image sensors contains a series or row of sensor elements which in each case consist of photodiodes, MIS capacitors, or photodiodes and MIS capacitors associated therewith. The structure and the manner of operation of such image sensors are described, for example, in the German patent application Ser. No. P 2,936,491.8, incorporated herein by reference. The outputs of the sensor elements of the image sensor 19 are connected with parallel inputs 26 of an evaluating circuit 27, while the outputs of the sensor elements of the image sensor 20 are directed to parallel inputs 28 of circuit 27. An output 29 is connected with a device 30 which indicates the distance of the object. On the other hand, the output 29 can in an advantageous manner be connected with a focusing device 31 which in dependence upon a signal which is measurable at 29 adjusts the spacing required for the focusing of the lens 2 from the focal plane 6 by means of an activating element indicated by means of the broken line 32. The evaluating circuit 27 can advantageously be integrated into the doped semiconductor body 21.

Two axis-parallel rays 33 and 34 which come in through the partial aperture diaphragm P1 meet in the image or focal point 23 of the plane 14. Also, axis-parallel rays 35 and 36 which enter through diaphragm P2 meet in the image point 22 of the plane 14. The points 22 and 23 thereby correspond to an object point which is located at a very great distance from the camera 1. If its distance is smaller, then light rays proceed from it which to the extent that they enter through the partial aperture diaphragm P1, meet in an image or focal point of the plane 14 which lies under the point 23 by the distance x in FIG. 2. On the other hand, light rays which proceed from the object and come in through P2 meet in an image or focal point of the plane 14 which in FIG. 2 lies above the point 22 by the distance y. The sum x+y thereby produces a measurement for the distance of the object from the camera 1. If one observes an entire line of the scene to be photographed which is scanned by means of the image sensors 19 and 20, then there is a relative displacement corresponding to the value x+y between brightness gradients or progressions comparable to one another which activate the image sensors.

The value of the relative displacement x+y is determined in the evaluating circuit 27 in this manner. The sensor signals of the one image sensor are checked with respect to their correlation with the sensor signals of the other image sensor in dependence upon varied position displacements. The position displacement whereby the maximum correlation occurs corresponds to the value x+y which is sought. At the output 29, an electrical value is measurable which corresponds to this value and thus to the distance of the object. The manner operation and construction of such as evaluating circuit is described, for example, in U.S. Ser. Nos. 168,648 or in 020,813 and 020,812, all incorporated herein by reference.

In particular with the use of the focusing device 31, the lens 2 does not need to be adjusted to the distance "infinite" before each distance measurement or focusing. Proceeding from the position of the lens in each case, then the value x+y represents a measurement for the deviation of the distance of the object from the distance to which the lens 2 is set at that time. The electrical value measurable at point 29 thereby corresponds to the required lens adjustment with which a sharp imaging of the object is attained.

If the lens parts 13a and 13b are designed as partial pieces of convergent or collecting lenses, the optical axes of which do not correspond to the lines 24 and 25, but rather are closer to one another or further removed from one another, then the spacing changes brought about between the points 22 and 23 can be compensated by means of inserted deflection elements, in particular deflection prisms 37, 38 for the increasing of this spacing or by means of deflection prisms rotated by 180° for decreasing of the same. In place of the lens parts 13a and 13b, also complete convergent lenses, or lenses with the function of convergent lenses, can be used whose diameters are significantly smaller than the diameter of the view finder eyepiece 9, so that they define the partial bundles of rays 11 and 12 for themselves. Also, in this case, deflection elements or prisms 37, 38 can be provided which then help in determining the resulting spacing between the points 22 and 23.

By means of insertion of a separating screen 21a between the two image sensors 19, 20, a good separation of the image information obtained by means of the partial aperture diaphragms P1 and P2 is attained.

The condensing lens 7a can advantageously be designed as a Fresnel lens whereby, however, a part of the lens lying within an image strip or segment 39 which is scanned by the image sensors 19, 20 is not divided into individual lens zones. Further, the adjustment disk 7 can be dulled. It is, however, necessary to leave out the dulling in the vicinity of the image segment or strip 39. If for visual focusing monitoring, in a manner known per se a microprism grid or screen is provided on the surface of the field or condensing lens 7a. This must not be present in the area of the image strip 39 which is scanned by the image sensors 19 and 20.

In FIG. 3, the path of rays shown already in a top view in FIG. 2 is depicted in perspective fashion. The region 39 which is left open lies, as is apparent from this, parallel to a plane which proceeds through the midpoint ray 40 of the partial bundle of rays 11 and the mid-point ray 41 of the partial bundle of rays 12. With 42, the optical axis of the entire system is designated, which, as a result of the flattening or levelling of the path of the rays, is folded into the optical axis of the lens 2. The viewing direction with viewing of the view finder eyepiece 9 for the purpose of the scene search is indicated at 43.

Instead of the folding or swinging mirror 4, for example, also a stationary arranged beam divider, for example, a semi-permeable half-silvered mirror, can be provided which divides the path of rays of the lens 2 into a first path of ways running toward the focal plane 6 and into a second path of rays running toward the view finder 8, 9. Therefore, the camera can also be designed as a moving picture camera.

Although various minor modifications may be suggested by those versed in the art, it should be understood that I wish to embody within the scope of the patent warranted hereon, all such embodiments as reasonably and properly come within the scope of my contributions to the art.

I claim as my invention:

1. A photographic or electronic camera with an optoelectronic distance measuring system, comprising: a picture-taking focal plane and lens means spaced therefrom in a path of rays of an object and having two partial aperture diaphragm means associated therewith for creating first and second partial bundles of rays corresponding to first and second images of the object which are to be projected onto two linear image sensors, each having a plurality of sensor elements; an evaluating circuit means connected to the image sensors and which in dependence upon varying position displacements of images and their corresponding sensor signals obtained from the one image sensor with respect to sensor signals obtained from the other image sensor determines a maximum correlation between the signals and an associated position displacement with a corresponding electrical value being formed indicative of distance of the object from the camera; device means for selectively deflecting the ray path at least partially to a view finder for single reflex operation; between said device means and the view finder a condensing lens; an eyepiece of the view finder; two focusing lens parts arranged in a path of rays of the eyepiece of the view finder, said lens parts locating the partial aperture diaphragms and associated first and second partial bundles of rays; and in a path of said partial bundles of rays which penetrate said lens parts, deflection element means being provided which deflect the paths of rays onto the image sensors.

2. A camera according to claim 1 wherein the deflection element means also lie in a path of rays of the view finder eyepiece.

3. A camera according to claim 1 which is a single reflex camera with means for selectively allowing the rays to pass to said focal plane when a picture is to be taken.

4. A camera according to claim 1 wherein the lens parts have optical axes which in each case are laterally displaced with respect to an optical axis of the view finder eyepiece.

5. A camera according to claim 1 wherein the lens parts are fastened to the view finder eyepiece.

6. A camera according to claim 1 wherein the deflection elements comprise deflection mirrors.

7. A camera according to claim 1 wherein the deflection elements comprise deflection prisms.

8. A camera according to claim 1 wherein the image sensors are integrated into a doped semiconductor body.

9. A camera according to claim 8 wherein the evaluating circuit means is integrated into the doped semiconductor body.

10. A camera according to claim 1 wherein a device means for indicating a distance of the object is connected after the evaluating circuit means.

11. A camera according to claim 1 wherein a focusing device means for moving said lens means is connected after the evaluating circuit means.

12. A camera according to claim 1 wherein between the image sensors there is arranged a screen which separates the first and second partial bundles of rays from one another.

13. A camera according to claim 1 wherein in the path of rays of the lens means a view finder adjustment disk is provided.

14. A camera according to claim 1 wherein the condensing lens is designed as a Fresnel lens.

15. A camera according to claim 14 wherein the part of the condensing lens which corresponds to an image segment which is scanned by the image sensors is not divided into individual lens zones.

16. A camera according to claim 1 wherein the condensing lens is provided with a microprism screen except in the area of an image segment scanned by the image sensors.

17. A camera according to claim 13 wherein the view finder adjustment disk displays a matte area except in an area of an image segment scanned by the image sensors.

18. A camera, comprising: a lens and a picture-taking focal plane spaced from the lens and which falls in a path of rays of an object passing through the lens; two partial aperture diaphragms associated with the lens for creating first and second partial bundles of rays corresponding to first and second images of the object to be utilized in distance measurement, a swinging mirror which in a first downwardly position permits single reflex operation by deflecting the path of rays from the lens through a condensing lens and prisms to a view finder; in a second position of the swinging mirror the path of rays is permitted to pass unobstructed to the picture-taking focal plane; an eyepiece of the view finder; two focusing lens parts arranged in a path of rays of the eyepiece of the view finder which in conjunction with deflection elements direct the first and second partial bundles of rays onto first and second corresponding and spaced apart image sensors; and evaluation circuit means connected to the image sensors which in dependence upon varying position displacements of the respective images and their accompanying sensor signals determines a maximum correlation between the signals and an associated position displacement with a corresponding electrical value indicative of distance of the object.

* * * * *